United States Patent [19]

Khoe et al.

[11] 4,384,038
[45] May 17, 1983

[54] METHOD OF PRODUCING INTEGRATED OPTICAL WAVEGUIDE CIRCUITS AND CIRCUITS OBTAINED BY THIS METHOD

[75] Inventors: Giok D. Khoe; Hendrikus G. Kock, both of Eindhoven, Netherlands; Dieter Küppers; Hans-Jürgen Lydtin, both of Aachen, Fed. Rep. of Germany

[73] Assignee: U.S. Philips Corporation, New York, N.Y.

[21] Appl. No.: 319,774

[22] Filed: Nov. 9, 1981

[30] Foreign Application Priority Data

Nov. 25, 1980 [NL] Netherlands ................. 8006410

[51] Int. Cl.³ .................... G02B 5/174; B05D 3/12
[52] U.S. Cl. .................... 430/321; 350/96.11; 427/38; 427/39; 427/163; 427/167
[58] Field of Search ............ 427/38, 39, 163, 167; 430/321; 350/96.11

[56] References Cited

U.S. PATENT DOCUMENTS

Re. 30,635  6/1981  Kuppers et al. ............... 427/167 X
4,296,143 10/1981  Franken et al. .................... 427/38

FOREIGN PATENT DOCUMENTS 17296 10/1980 European Pat. Off. .
53-70939 5/1978 Japan .

*Primary Examiner*—James R. Hoffman
*Attorney, Agent, or Firm*—Marc D. Schechter

[57] ABSTRACT

Optical waveguide circuits, such as signal splitters, can be produced by etching grooves in a transparent, glass substrate and by filling the grooves with glass having a higher refractive index than the material of the substrate. The grooves have a semicircular cross-section and the filling glass is produced by a low temperature plasma-activated chemical vapor deposition process. Two substrates can be placed on top of each other, with the surfaces in which the filled grooves have been provided in contact, to form an integrated optical circuit.

9 Claims, 8 Drawing Figures

METHOD OF PRODUCING INTEGRATED OPTICAL WAVEGUIDE CIRCUITS AND CIRCUITS OBTAINED BY THIS METHOD

BACKGROUND OF THE INVENTION

The invention relates to a method of producing an integrated optical waveguide circuit made up of a glass substrate which is provided with grooves. Glass, having a refractive index which is higher than the refractive index of the substrate, is deposited on the substrate in such a manner that the grooves are filled with the deposited glass. Thereafter, the excess deposited glass is removed, to the extent that the deposited glass remains only in the grooves.

Published Japanese Patent Application (Kokai) No. 53-70939 describes a method of producing an optical waveguide circuit. According to an English-language abstract published in Patents Abstracts of Japan (Volume 2, page 5556E78, 1978), the following procedure is followed. Grooves, which can be smoothed by means of etching or fire polishing if desired, are mechanically formed in a glass, for example quartz, base plate. A mixture of gases such as $SiCl_4$, $GeCl_4$ and $O_2$ is supplied to the base plate, and by means of a CVD method a fine powder of $SiO_2$ and $GeO_2$ is deposited on the base plate. The deposited powder is then vitrified by heating. Thereafter, the excess deposited glass is removed, by polishing, to the extent that deposited glass remains only in the grooves. The glass remaining in the grooves forms a low-loss optical waveguide. If so desired, a protective layer of $SiO_2$ and $B_2O_3$ may be provided on the glass plate. The Figures reproduced in the abstract show that the grooves in the base plate have a rectangular cross-section.

The above-described method can be effectively performed with only a limited choice of starting materials because in this method, both during deposition of the fine $SiO_2$ and $GeO_2$ powder and during the subsequent vitrification, the substrate must be heated to rather high temperatures. The substrate and the grooves provided therein must retain their shapes at these high temperatures. As a result, in the majority of cases the use of quartz substrates is required.

A further limitation of the described method is that the coefficients of thermal expansion of the deposited glass and the substrate material must not differ greatly. Otherwise during cooling, after vitrification, the deposited glass may become loosened from the substrate.

Finally, the rectangular cross-section of the grooves in the above-described optical waveguide circuits is optically disadvantageous, as will become apparent below.

SUMMARY OF THE INVENTION

An object of the invention is to provide a method of producing integrated optical waveguide circuits in which the substrate need not be heated to temperatures as high as used in the past.

Another object of the invention is to provide a method of producing integrated optical waveguide circuits in which a relatively wide variety of materials can be used.

A further object of the invention is to provide a method of producing integrated optical waveguide circuits in which the waveguides have a cross-section which is not rectangular.

According to the invention, these objects are accomplished by a method in which the substrate is provided with grooves having a substantially semicircular cross-section. Next, glass is deposited directly from the gas phase onto the substrate, to fill the grooves, by means of a nonisothermal plasma-activated chemical vapor deposition (PCVD) process.

The inventive method may generally be performed without heating the substrate. Actually, however, when the present method is used, the temperature of the substrate normally increases to some hundreds of degrees Celsius as a result of the plasma treatment. Also, in some cases it may be advantageous to preheat the substrate before it is brought into contact with the plasma. The maximum substrate temperature, however, must remain below the substrate's softening temperature.

Since, the chemical reaction in the PCVD process proceeds at a sufficiently high speed (at least at approximately 500° C.) a wide choice of materials, both for the substrate and for the composition of the glass to be deposited, is made possible. The wider choice in substrate materials offers the possibility of selecting properly workable materials.

Grooves having a substantially semicircular cross-section are advantageous, from an optical point of view, particularly if a portion of the substrate is provided with a predetermined pattern of such grooves and a portion of another substrate is provided with a mirror-image of the same pattern of such grooves. In such a case, glass is deposited directly on the two substrate portions, to fill the grooves, by means of a nonisothermal plasma-activated CVD process and, after polishing the substrate portions, deposited glass remains only in the grooves. The substrate portions can then be placed on top of each other so that the glass-filled grooves are in registration and form a circuit of waveguides having substantially circular cross-sections.

The substantially semicircular cross-section of the grooves guarantees that the grooves will be uniformly filled with glass during the deposition process. There is no danger of cavities being formed in the present method, as compared to the method where the grooves are of a rectangular cross-section. In the latter case, if glass powder is deposited and thereafter vitrified in the grooves, there is a particular problem with complete filling.

Moreover, in spite of the comparatively low deposition temperature used in the PCVD process, stresses could build up in the glass deposited in the rectangular grooves due to a difference in the coefficients of expansion of the deposited glass and the substrate material. In contrast, the substantially semicircular cross-section of the grooves results in a more symmetrical stress pattern. Because of the symmetrical stress pattern, stresses are less dangerous to the structure.

The grooves may be formed in the substrate by mechanical means, for example by pressing the grooves into the surface of a substrate. However, the grooves are preferably provided by means of etching. By etching, it is possible to obtain the desired semicircular cross-sectional shape much more accurately than by means of pressing.

Glass is deposited directly onto the substrate, in order to fill the grooves, from the gas phase by means of a nonisothermal plasma-activated chemical vapor deposition (PCVD) process.

A "nonisothermal plasma-activated chemical vapor deposition process" is here understood to mean a process in which a cold plasma is used for activation. In a cold plasma, only the electrons have a high kinetic energy. With such a plasma it is possible, for example, to react mixtures of gases or gas components in the vapor state, where the reaction could not otherwise be activated thermally. By means of a nonisothermal plasma-activated CVD process, glass layers can be deposited directly from the gas phase at comparatively low temperatures. This is advantageous as compared with processes in which pulverulent particles are deposited on a substrate, which particles must then be heated to obtain a glass layer. In such processes, which proceed wholly or partly homogeneously in the gas phase, it is particularly difficult to provide a waveguide having a uniform refractive index gradient. This is due to diffusion after deposition.

In the nonisothermal plasma activated CVD process the deposition reaction proceeds heterogeneously, so that thick layers can be uniformly deposited on the entire substrate. In fact, the production of, for example, a graded index waveguide does not offer any problem.

A further advantage of this process is that it proceeds at a comparatively low temperature, i.e. between ambient temperature and approximately 500° C. At such a low deposition temperature, the risk of a harmful stress formation in the deposited glass (when there is a difference between the coefficients of thermal expansion of the deposited glass and the substrate) is smaller than in a CVD process which requires temperatures well above 500° C.

If the method according to the invention is used, optical waveguides of both the stepped index type and of the graded index type can be produced. To this end the grooves in the substrate are provided with a glass consisting of $SiO_2$ and a refractive index-increasing dopant, such as $Si_3N_4$, $Sb_2O_3$, and $GeO_2$. In view of its high refractive index $Si_3N_4$ is preferred.

Thereafter, the deposited layer is removed by grinding and/or polishing to such an extent that deposited glass remains only in the grooves.

The method according to the invention will now be described in detail, by way of example, with reference to the accompanying drawing. The drawing also shows a number of waveguide circuits, both in the form of passive and of active components, which can be produced wholly or partly by means of the method according to the invention.

DESCRIPTION OF THE PREFERRED EMBODIMENTS

The integrated optical waveguide circuits produced by the inventive method are produced on a glass substrate. A fused silica substrate may be used, for example, and is preferred where the deposited glass consists of fused silica doped with germania. However, where the deposited glass consists of fused silica doped with $Si_3N_4$ (which has a greater coefficient of thermal expansion than fused silica doped with germania), a Pyrex (trademark) substrate is preferred.

Figure 1:
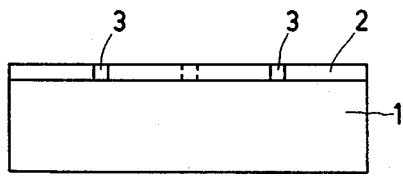
FIG. 1 is a cross-sectional view of a substrate with a mask.

Referring to FIG. 1, in the first step of the method according to the invention, an etching mask 2, for example made of metal, is provided on glass substrate 1. A suitable metal is, for example, chromium, which may be deposited on the substrate 1 by sputtering. A portion 3 of the metal layer (which may have a thickness of typically 0.4 microns) is removed, by etching, to form a desired pattern. The desired pattern can be produced by, for example, employing a photomask (not shown) which covers the metal layer. The metal-etching agent may have, for example, the composition:

220 grams cerium ammonium nitrate
100 milliliters of a solution containing 65% nitric acid
900 milliliters water.

After the portions 3 (which may have a width of, for example, from 5 to 7 microns) have been removed to form the mask 2 by etching through the apertures in the photomask, the photomask is removed. Photomask materials and etching agents suitable for this purpose are well known and are commercially available. A novolac resin with a light-sensitive diazo compound, for example naphthodiazoquinonesulfonic acid ester may be used as the photomask material.

After mask 2 is formed, the substrate 1 is partially removed by etching via the apertures 3. A suitable etching agent for the glass substrate consists of a mixture of 100 milliliters 40% HF and 100 milliliters of a solution obtained by mixing 600 milliliters of concentrated $H_2SO_4$ (98%) with 150 milliliters $H_2O$. Two grams of gelatine is dissolved in the mixture in order to increase the viscosity of the etchant to suppress circulation of the etchant on the substrate. Suppression of circulation helps to assure that the cross-sections of the grooves will be substantially semicircular.

Figure 3:
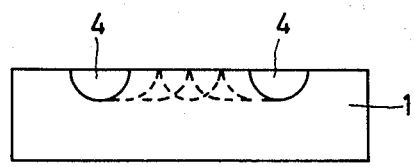
FIG. 3 is a cross-sectional view of the substrate after etching and removal of the mask.
Figure 2:
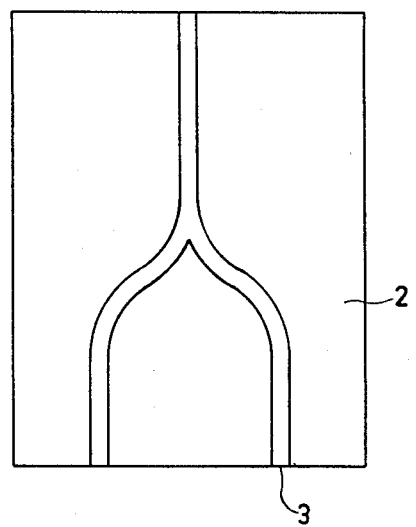
FIG. 2 is a plan view of a substrate with a mask.
Figure 4:
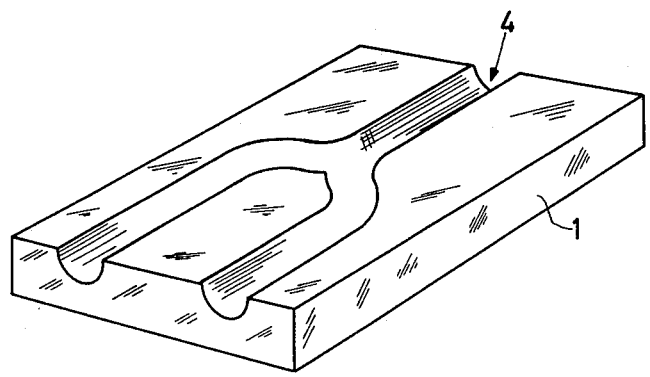
FIG. 4 is a perspective view of a substrate having a groove pattern.

After a sufficient quantity of the substrate has been removed by etching, the mask 2 is removed. There now remain grooves 4, in the substrate 1, which have a semicircular cross-section. (FIG. 3.) FIG. 4 is a perspective view of the substrate 1 with the grooves 4.

Figure 5:
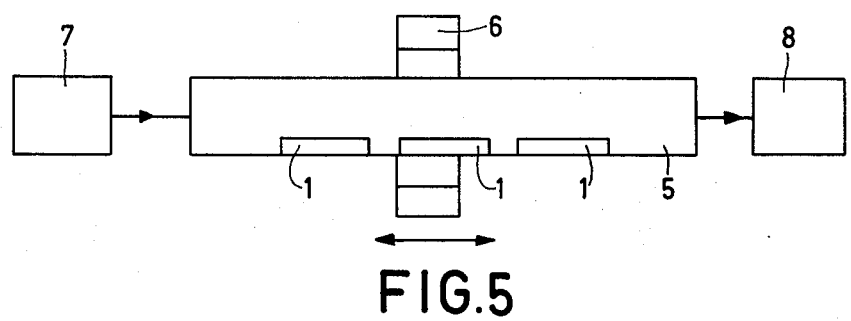
FIG. 5 shows, schematically, a number of substrates in a deposition chamber.

Referring to FIG. 5, after substrate 1 is provided with grooves, it is then coated with a layer of glass, having a higher refractive index than the substrate, in a reaction chamber 5, which includes a microwave cavity 6. The coating is achieved by means of the known nonisothermal plasma activated chemical vapor deposition (PCVD) method. (See, for example, U.S. Pat. No. Re. 30,635 the contents of which are hereby incorporated by reference, as far as necessary.) In FIG. 5, the gaseous precursors are supplied to one end of the reaction chamber 5 by gas supply unit 7. Vacuum pump 8, at the other end of chamber 5, assures a continuous and uniform gas flow.

While U.S. Pat. No. Re. 30,635 states that it is preferred to heat the glass tube substrates to between 800° C. and 1200° C., it is not necessary (though in some cases it may be preferred) to heat the substrates up to these temperatures in the method according to the invention. This temperature range was referred in U.S. Pat. No. Re. 30,635 in order to produce coatings which would not crack either during or after the collapsing and drawing of the inner coated tube. However, there is neither collapsing nor drawing involved in the production of integrated optical circuits.

Figure 6:
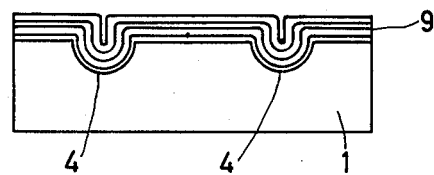
FIG. 6 is a cross-sectional view of a substrate after the deposition of a number of layers.

If a number of layers having different refractive indices are deposited on top of each other, an assembly is obtained which is shown in cross-section in FIG. 6. A number of layers 9 are deposited onto the substrate 1 and into the grooves 4. FIG. 6 shows only a few layers. In practice, the depth (radius) of the grooves is, for example 50 microns, and the number of layers may amount to, for example, 100. If a waveguide of the graded index type is to be produced, the refractive indices of these layers increase toward the center of the semicircle. This may, for example, be achieved, where the layers comprise a mixture of $SiO_2$ and a refractive-index-increasing component (such as $Si_3N_4$ or $GeO_2$) by increasing the relative quantity of the refractive-index-increasing component in each subsequently deposited layer. It is, of course, alternatively possible to produce a waveguide of the step index type by depositing a number of layers having the same composition, but having a higher refractive index than the substrate, on top of each other in the grooves 4.

Figure 7:
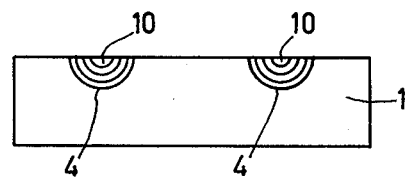
FIG. 7 is a cross-sectional view of a substrate after polishing.

After the layers 9 are deposited on the substrate 1, portions of the layers 9 are removed by polishing down to the surface of the substrate 1. FIG. 7 is a cross-sectional view of the assembly after polishing, reference numeral 10 designating the waveguide located in the grooves 4 in the substrate.

Figure 8:
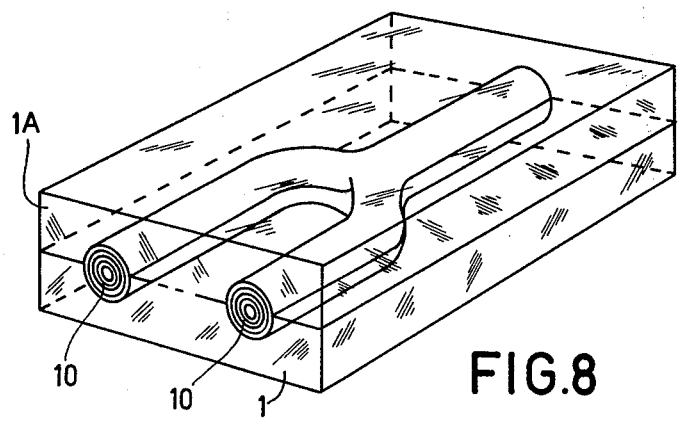
FIG. 8 is a perspective view of a signal splitter obtained by fastening two substrates, with filled grooves, to each other.

Finally, FIG. 8 shows an assembly obtained after two substrates, containing waveguides with semicircular cross-sections, are brought into contact with each other to form waveguides with circular cross-sections. Alternatively, the "semicircular" waveguide shown in FIG. 7 may be coated with a layer of glass having a lower refractive index than the glass in the grooves. Such a layer has a protective function.

With the method according to the invention it is also possible to produce, for example, "adders" and "splitters" with more than the two branches shown in FIGS. 7 and 8. It is also possible to produce waveguides, for example in two substrates which are put on top of each other, which cross or intersect each other without causing interference between the signals passing through the waveguides.

We claim:

1. A method of producing an integrated optical waveguide circuit comprising the steps of:
    providing a glass substrate having a refractive index and having a surface;
    forming grooves in the substrate surface; and
    depositing glass, having a higher refractive index than the refractive index of the substrate, in the grooves;
    CHARACTERIZED IN THAT the grooves formed in the substrate have a substantially semicircular cross-section and are formed in a predetermined pattern by the steps of:
    providing a layer of metal on the substrate surface;
    providing a photomask on the metal layer, said photomask having apertures corresponding to the predetermined pattern of grooves;
    etching the metal layer, through the apertures in the photomask, down to the substrate to form apertures in the metal layer; and
    etching the substrate through the apertures in the metal layer.

2. A method as claim 1, CHARACTERIZED IN THAT the step of depositing glass comprises depositing glass directly from the gas phase by means of a nonisothermal plasma activated chemical vapor deposition process.

3. A method of producing an integrated optical waveguide circuit comprising the steps of:
    providing a glass substrate having a refractive index and having a surface;
    forming grooves in the substrate surface;
    depositing glass, having a higher refractive index than the refractive index of the substrate, on the substrate and in the grooves so as to fill the grooves; and
    removing the excess deposited glass on the substrate so as to leave deposited glass in and filling the grooves;
    CHARACTERIZED IN THAT:
    the grooves formed in the substrate have a substantially semicircular cross-section and are formed in a predetermined pattern;
    the step of depositing glass comprises depositing glass directly from the gas phase by means of a nonisothermal plasma activated chemical vapor deposition process; and
    the grooves are formed by the steps of:
    providing a layer of metal on the substrate surface;
    providing a photomask on the metal layer, said photomask having apertures corresponding to the predetermined pattern of grooves;
    etching the metal layer, through the apertures in the photomask, down to the substrate to form apertures in the metal layer; and
    etching the substrate through the apertures in the metal layer.

4. A method as claimed in claim 3, CHARACTERIZED IN THAT the deposited glass comprises a mixture of $SiO_2$ and $Si_3N_4$.

5. An integrated optical waveguide circuit made by the method of claim 4.

6. A method as claimed in claim 3, CHARACTERIZED IN THAT a second substrate having a surface with glass-filled grooves is prepared by the same method, the pattern of grooves in the second substrate being a mirror image of the pattern of grooves in the first substrate, and the substrate surfaces are placed in contact with each other such that the grooves are in registration and form waveguides having substantially circular cross-sections.

7. An integrated optical waveguide circuit made by the method of claim 6.

8. A method as claimed in claim 3, CHARACTERIZED IN THAT the metal layer comprises chromium.

9. An integrated optical waveguide circuit made by the method of claim 3.

* * * * *